United States Patent [19]

Eriksson

[11] Patent Number: 4,719,792
[45] Date of Patent: Jan. 19, 1988

[54] METHOD AND A DEVICE FOR TESTING THE TIGHTNESS OF AN ENGINE

[76] Inventor: Ingemar Eriksson, Zinkvägen 10, 860 20 Njurunda, Sweden

[21] Appl. No.: 849,196

[22] Filed: Apr. 7, 1986

Related U.S. Application Data

[63] Continuation of Ser. No. 702,474, Feb. 19, 1985.

[30] Foreign Application Priority Data

Feb. 21, 1984 [SE] Sweden ................................ 8400929

[51] Int. Cl.⁴ ........................................... G01M 3/00
[52] U.S. Cl. ........................................ 73/47; 73/116; 73/117.3
[58] Field of Search ............... 73/47, 168, 116, 115, 73/117.3

[56] References Cited

U.S. PATENT DOCUMENTS

| | | | |
|---|---|---|---|
| 1,496,384 | 6/1924 | Seppmann | 73/47 |
| 1,867,698 | 7/1932 | Harris | 73/47 |
| 2,625,033 | 1/1953 | Adair | 73/47 |
| 2,782,637 | 2/1957 | Schldorf | 73/168 |
| 2,811,852 | 11/1957 | Shucil et al. | 73/47 |
| 3,320,801 | 5/1967 | Rhindress, Jr. | 73/47 |

FOREIGN PATENT DOCUMENTS 960273  4/1950  France ................................. 73/47

*Primary Examiner*—Jerry W. Myracle
*Assistant Examiner*—Hezron E. Williams
*Attorney, Agent, or Firm*—Gifford, Groh, VanOphem, Sheridan, Sprinkle and Dolgorukov

[57] ABSTRACT

A method and a device for testing the tightness of an engine of the kind having at least one cylinder (1), a piston (2) movable therein and a crankcase (3) with crank means (4, 5), which are drivable by the piston, is based on measuring of the leakage of gases passing the piston into the crankcase by connection of a measuring apparatus (8) so that it communicates with the interior of the crank case. (FIG. 1).

8 Claims, 4 Drawing Figures

U.S. Patent
Jan. 19, 1988
4,719,792
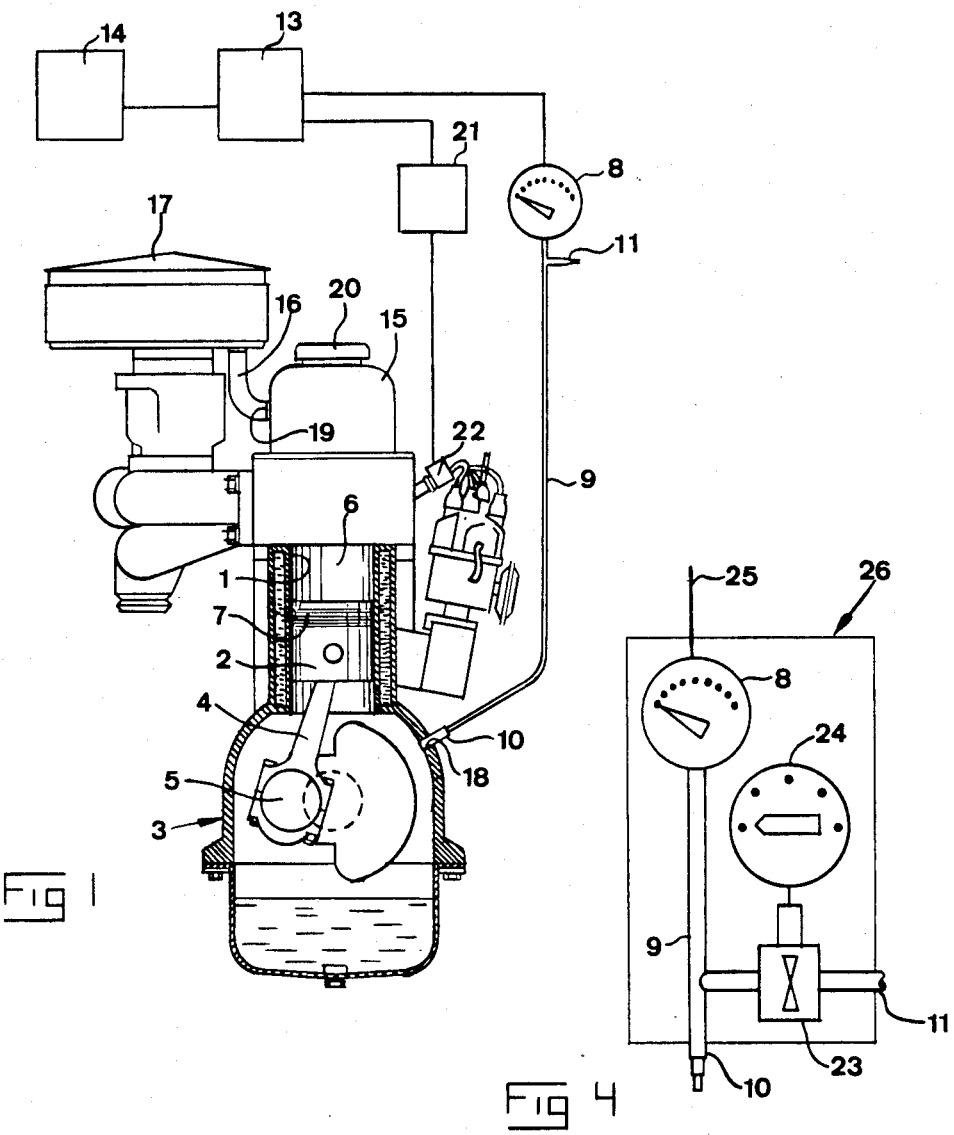
Fig 1
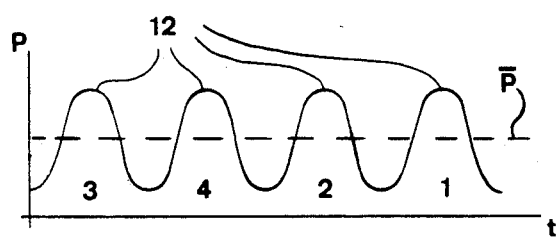
Fig 2
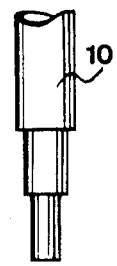
Fig 3
Fig 4

METHOD AND A DEVICE FOR TESTING THE TIGHTNESS OF AN ENGINE

FIELD OF THE INVENTION AND PRIOR ART

This is a continuation of application Ser. No. 702,474 filed on Feb. 19, 1985, now abandoned.

This invention relates to a method and a device for testing the tightness of an engine in accordance with the preambles of the appended claims 1 and 3.

The most common technique for testing the tightness of the combustion chambers in an engine comprises that one replaces the ignition plugs by a manometer and then drives the engine around by means of the starter motor. This technique has several disadvantages. In the first place the measuring values do not become completely representative for the operation conditions of an engine during normal operation. In the second place the measuring values vary a little bit in dependence of the working speed of the starter motor, which speed for example varies in consequence of varying charging of the accumulator. Further, in many situations it is a disadvantage that the obtained measuring values are giving information about the total tightness state in the combustion chamber in question. A total leakage is without exception composed of several partial leakages, namely valve leakages and leakages passing the sealing means between the piston and the cylinder wall. In addition to that also leakages in the cylinder head gasket can occur etc. From the renovation point of view for example a valve leakage generally is substantially easier and cheaper to eliminate than a piston sealing leakage. The latter can necessitate replacement of pistons and cylinder liners or alternatively cylinder reboring.

Known is also to arrange a manometer which during operation measures the pressure in the combustion chambers. This is a more exact measuring of the total tightness state but for the rest the disadvantages discussed above are remaining. To this the fact comes that the manometers must endure so hard working conditions that their costs will become relatively high if a reasonable life time shall be obtained.

SUMMARY OF THE INVENTION

The object of the invention is to point out a way of reducing the disadvantages discussed above, wherein specially a method and a device respectively are intended, with the help of which one shall be able to determine the untightnesses which from the renovation point of view generally are the most troublesome, with high reliability and in a comparatively simple way.

In accordance with the invention this object is obtained through the method and device characteristics which are described in the appended claims.

Thus, the present invention is based on the surprising discovery that gas leakages downwardly into the crank case which occur during normal operation of the engine are sufficient in order to, by means of a measuring apparatus communicating with the interior of the crank case, make it possible to produce measuring values which give very accurate and good information about the tightness of the sealings between the pistons and the cylinder walls and thereby the degree of wear. After determining the piston sealing leakage in accordance with the principle of the invention can determine the total cylinder leakage by using conventional technique and by means of comparison of the measuring values one can get information also about the valve leakage.

BRIEF DESCRIPTION OF THE DRAWINGS

With reference to the appended drawing, below follows a specific description of the invention.

In the drawings;

FIG. 1 is a schematic, partly sectioned view of an engine with the device according the invention, FIG. 2 is a pressure/time diagram (P/t), FIG. 3 is a detail view of a portion of a nozzle, and FIG. 4 is a schematic view of a preferred embodiment of the device according to the invention.

DETAILED DESCRIPTION OF THE PREFERRED EMBODIMENT

In FIG. 1 a conventional four stroke petrol engine is illustrated, which here is thought to have four cylinders 1 with pistons 2 movable therein and a crank case 3 with crank means 4, 5, which are drivable by the pistons. The crank means are in conventional way formed by a crank axle 5, which through piston rods 4 is connected to the pistons 2. Each cylinder 1 and piston 2 form a combustion chamber 6 of varying size. Each piston is through piston rings 7 sealed in relation to the cylinder wall.

According to the invention one measures during normal operation of the engine, with other words during successive explosions in the combustion chambers 6, the leakage of gases passing the piston 2 and the sealing rings 7 into the crank case 3 by connecting a measuring apparatus 8 so that it communicates with the interior of the crank case 3.

The invention is based on the realisation that every explosion of combustible gases in a cylinder gives rise to a simultaneous inflow of gases passing the sealing rings 7 into the crank case 3. The measuring apparatus 8 consists in this example of a manometer which through a conduit 9 and a connecting nozzle 10 communicates with the interior of the crank case 3. Through a restricted outlet 11 the gases coming into the conduit 9 are allowed to flow out to the atmosphere. In FIG. 2 a diagram describing the relationship pressure/time, which can be sensed by the manometer 8, is illustrated. The pressure peaks 12 indicated are representative for the leakage of gas into the crank case 3, which occurs in connection with the explosions in the different cylinders 1. Under the peaks 12 the ordinal number for corresponding cylinders is assigned. In the reality the pressure peaks 12 follow each other so quickly that one with a simple manometer 8 of needle index type with relatively slow needle reaction will not be able to identify the individual peaks 12. On the dial of the manometer 8 an average corresponding to the dashed level $\overline{P}$ would therefore in practice be shown. Such information about the average pressure is often completely sufficient in order to get the wanted information about the tightness of the sealing rings 7. By performing measurements of a representative number of engines of the same type one can determine reference values, with which a produced measure value can be compared in order to determine the tightness state of the just measured engine of the same type.

If one uses a manometer 8 which consists of a transducer of quick reacting type and which transforms the existing pressure to an electrical signal one can by means of an apparatus 13 process the output signals from the transducer in an already known way and show the information delivered by the transducer in a presentation apparatus 14, for example an oscilloscope, in the form which is indicated in FIG. 2, so that one can identify the different pressure peaks 2 belonging to the different cylinders 1 and thus observe if any deviation between them exists. So far as the device up to now has been described, it is however, not possible to determine which pressure peak 12 belongs to a very special cylinder 1.

The interior of the crank case 3 generally communicates unobstructedly with the room under the valve cap 15 of the engine. For ventilation of this room, and thereby the interior of the crank case 3, a conduit 16 is connected between the valve cap 15 and the air inlet device 17 of the engine. In order to avoid oil leakage the crank case 3 for the rest is proportionately well sealed in relation to the surrounding atmosphere. Also the valve cap 15 closes comparatively tightly against the engine block. In the example it has, in order to achieve clearness, been illustrated that the nozzle 10 on the conduit 9 has been inserted in an opening 18 in the wall of the crank case 3. This has mainly been done in order to make it easier to understand the present invention. Even if it in itself were possible to provide such an opening 18, this opening 18 does not exist in the reality but for the sake of simplicity the nozzle 10 is instead intended to become inserted into the opening 19, which generally already exists at modern engines and which is exposed on removing the conduit 16 and communicates with the interior of the valve cap 15. Through the conduit 16 normally a weak suction is applied to the interior of the crank case 3. The cover 20, which usually is adapted on the cap 15 and removed exposes an opening for refilling of oil to the oil path placed on the bottom of the crank case 3, does often close substantially completely tightly. Thus, when the cover 20 closes tightly and the nozzle 10 is inserted into the opening 19 there is, with exception of the conduit, 9 no further gas evacuation possibility from the interior of the crank case 3. This makes it possible to achieve a good accuracy of the measurement. As an alternative to this, the conduit 9 could be able to communicate with the crank case 3 through an opening in a cover means intended to replace the cover 20. It would then be necessary to close the opening 19 against gas outflow through this opening 19. When the ordinary cover 20 is of the type allowing passage of air (possibly provided with filter) it must be replaced by a tightly closing cover if the nozzle 10 communicates with the opening 19. Thus, it is important that the conduit 9 to the measuring apparatus 8 is substantially the only gas evacuation possibility from the otherwise substantially closed crank case 3 during the measurement.

The nozzle 10 can preferably be designed with a plurality of portions having different diameters, where the portions are so put into order that they gradually increases in diameter in the direction from the outer end of the nozzle 10. Through this an embodiment is obtained which can get a relatively universal application to different engine types and brands.

A preferred embodiment of the invention is illustrated in FIG. 4. Here a valve 23 is arranged at the conduit 9, before the outlet 11. To this valve 23 a regulating apparatus 24 is connected, by control of which the throttle degree of the valve 23 and, consequently, also the amount of gas outflow through the outlet 11 can be regulated. In this way the measuring apparatus 8, which is coupled thereafter, can be used for measuring the tightness of the piston sealing rings of engines of arbitrary size and type. The gas leakage of standard engine is, in the first place, dependent on the size of the cylinders, the number of cylinders and the type of engine (gasoline- or diesel engine). If the gas leakage, also of a completely intact engine, in consequence of these factors is to be great, the valve 23 is opened proportionately much, so that the pressure of the gas which arrives to the measuring apparatus 8 is lying within the measuring range of the measuring apparatus 8. In the other extreme case with a small gas leakage, the valve 23 is throttled down very much.

The measuring apparatus 8, the valve 23 and the regulating apparatus 24 are preferably arranged inside the same box like means 26. This box means 26 is of hand size and connectable through the nozzle 10 preferably to that end of the conduit 16 which is connected to the air inlet device 17 of the engine. Before the testing of the tightness, the regulating apparatus 24 is adjusted in accordance with a table preferably attached on the front side of the box means 26, so that the proper degree of opening of the valve 23 is adapted to the size and/or the type of the engine in order to obtain measuring values, the absolute magnitude of which will be a direct standard of the tightness of the engine and which are directly comparable between engines of different sizes and/or types. For example a measuring value of 40 units at a 1500 $cm^3$ gasoline engine would tell that this engine is in an better shape than a 8000 $cm^3$ diesel engine with a measuring value of 50 units. In this way universal limits for which measuring values one can accept can be set, and it will be possible to say if an engine must get a renovation or has to be replaced, independent of engine size and type. Thus, this universal instrument for giving an information about the leakage of gases passing a piston 2 into the crank case 3, and thereby also about the degree of wear of the engine, is very simple to handle and the change that faults will occur during the handling will therefore be minimal.

If so is desired the signals can be led through the cable 25 via the apparatus 13 to the presentation apparatus 14 in order to record or present the measuring values in an appropriate way.

In order to make the adjustment of the regulating apparatus 24 even more exact, consideration can be taken to other engine characteristics, e.g. the compression ratio of the engine, piston diameter, piston stroke etc. But these other characteristics have been found to influence the measuring values in only a relatively insignificant way as long as standard engines are in view.

In an embodiment for determination of the leakage passing the piston sealing rings 7 of a single cylinder 1 in an multiple cylinder engine, the device according to the invention comprises an apparatus 21 for detecting when there is high pressure state in the respective cylinders 1. The apparatus 13 mentioned before can then be adapted to coordinate measuring values relating to the leakage with the respective cylinder 1, to which the measuring values belong, on basis of the information from the detecting apparatus 21 and the manometer 8.

As schematically indicated in FIG. 1 the detecting apparatus 21 can be provided with means 22 in order to detect when the ignition plugs belonging to the cylinders 1 are set under ignition voltage. One detecting means 2 is generally connected to each ignition plug or ignition cable. The apparatus 13 can via the detecting apparatus 14, indicate, as indicated by means of the numerals 3, 4, 2 and 1, to which cylinder 1 the corresponding pressure peak 12 belongs. Naturally it is possible for an ordinary man skilled in the art of the measuring technique to present the pressure information and thereby leakage information in another way than as indicated in FIG. 2 by means of information processing equipment known per se, for example the information can be shown totally numerically. It is preferred that also a printer provides the measuring information in writing.

In a fuel injection engine, for instance a diesel engine, the detecting apparatus 21 can as an alternative be connected to the fuel injection device in order to detect when, the fuel is injected into the respective cylinders 1. Through this it is also possible with such an engine to coordinate the measured pressure value with the cylinder 1 belonging to this value.

As a further alternative the detecting apparatus 21 might be designed in order to detect when the fuel mixture in the respective cylinders 1 explodes. The detecting apparatus 21 would then have to comprise one shock detecting means for each cylinder 1, said shock detecting means might be located on the outside of the cylinder block near the different cylinders 1. Such detecting means are already known per se.

In using the device the conduit 9 and the nozzle 10 and possibly also the apparatus 21, if it exists, will be connected in the way discussed above. Now the engine can be started and the manometer 8 can record the pressure values during normal operation as an indication of the gas leakage into the crank case 3. Normally it is preferred to perform a measurement at idling speed and without load. It has been found that at idling it is not critical even if the rotation speed varies relatively much. The pressure indications from the manometer 8 can be calibrated as mentioned above, for instance by making the outlet 11 adjustable or through adjusting of the apparatus 13. Naturally the device can be modified in several ways within the scope of the idea of the invention. Above it has been described how the pressure values are used as a criterion on the gas leakage into the crank case 3. An alternative possibility will be to adapt the measuring apparatus 8 so that it will measure the volume of that gas which via the conduit 9 flows out from the crank case 3 during the operation of the engine. The gas volume per time unit is then an equally relevant standard of the gas leakage as the pressure values discussed above, but from the practical point of view it will probably be preferred to work with a measuring apparatus 8 of the kind sensing the pressure.

I claim:

1. A device for testing the fit of the parts of a combustion engine having a plurality of cylinders, a piston slidably movable in each cylinder and a crankcase with crank means drivably connected to the pistons, said device comprising:
   a measuring apparatus connected to the crankcase of the engine wherein said measuring apparatus fluidly communicates with the crankcase in order to measure the leakage of gaseous fluids circumventing the piston into the crankcase;
   a fluid outlet disposed between the crankcase and said measuring apparatus;
   means for detecting combustion in a particular engine cylinder; and
   means for distinguishing said particular cylinder from the remaining engine cylinders.

2. The device as defined in claim 1 wherein said distinguishing means comprises an apparatus for comparing the measured values of said detecting means and said measuring apparatus whereby said comparison relates to the fluid leakage of said particular cylinder.

3. The device as defined in claim 1 wherein said detecting means comprises an apparatus for detecting a high-pressure state in said cylinder.

4. The device as defined in claim 1 wherein said detecting means comprises an apparatus for detecting ignition of the engine plug corresponding to said particular cylinder.

5. The device as defined in claim 1 wherein said detecting means comprises an apparatus for detecting when fuel is injected into said particular cylinder.

6. The device as defined in claim 1 wherein said fluid outlet includes a valve for regulating the flow of fluid through said outlet, whereby said valve may be adjusted in accordance with the size and type of the combustion engine.

7. A method for testing the fit of the parts of a combustion engine having at least one cylinder, a piston slidably movable in the cylinder and a crankcase with crank means drivably connected to the piston, said method comprising the steps of:
   connecting a measuring apparatus having an adjustable measuring range so that it fluidly communicates with the interior chamber of the crankcase of the engine whereby said measuring apparatus measures the leakage of gaseous fluids circumventing the piston into the crankcase;
   adjusting the measuring range of the measuring apparatus by adjusting a regulation valve of said measuring apparatus, said regulating valve controlling fluid communication between the crankcase and the atmosphere wherein said regulating valve will be adjusted according to the size and type of engine;
   reading the value indicated by said measuring apparatus, the magnitude of which will provide a direct standard of the fit of the parts of the engine comparable between engines of different sizes and types.

8. A method for testing the fit of the parts of a combustion engine having at least one cylinder, a piston slidably movable in the cylinder and a crankcase with crank means drivably connected to the piston, said method comprising the steps of:
   connecting a measuring apparatus having an adjustable measuring range so that it fluidly communicates with the interior chamber of the crankcase of the engine whereby said measuring apparatus measures the leakge of gaseous fluids circumventing the piston into the crankcase during normal engine operation;
   adjusting the measuring range of the measuring apparatus according to the size and type of engine;
   reading the value indicated by said measuring apparatus, the magnitude of which will provide a direct standard of the fit of the parts of the engine comparable between engines of different sizes and types.

* * * * *